US012646303B1

(12) United States Patent
Kumar et al.

(10) Patent No.: US 12,646,303 B1
(45) Date of Patent: Jun. 2, 2026

(54) MULTI-MODAL OMNI-ANNOTATION

(71) Applicant: Amazon Technologies, Inc., Seattle, WA (US)

(72) Inventors: Abhijit Kumar, Edmonds, WA (US); Sugumar Murugesan, Pleasanton, CA (US); Sri Kaushik Pavani, Redmond, WA (US); Son D Tran, Mountain View, CA (US); Sunny Dasgupta, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 360 days.

(21) Appl. No.: 18/542,362

(22) Filed: Dec. 15, 2023

(51) Int. Cl.
*G06V 10/82* (2022.01)
*G06V 10/774* (2022.01)
*G06V 10/776* (2022.01)
*G06V 10/778* (2022.01)

(52) U.S. Cl.
CPC ........ *G06V 10/778* (2022.01); *G06V 10/7753* (2022.01); *G06V 10/776* (2022.01)

(58) Field of Classification Search
CPC . G06V 10/778; G06V 10/7753; G06V 10/776
See application file for complete search history.

(56) References Cited

U.S. PATENT DOCUMENTS

| | | | | |
|---|---|---|---|---|
| 10,970,645 B1* | 4/2021 | Kim | ........................ | G06N 3/088 |
| 2022/0309292 A1* | 9/2022 | Albrecht | ............... | G06F 18/241 |
| 2023/0260262 A1* | 8/2023 | Martinez | .............. | G06V 10/751 |
| | | | | 382/159 |
| 2025/0191348 A1* | 6/2025 | Qiu | ........................... | G06T 7/11 |

OTHER PUBLICATIONS

Yang, Zhaohui, et al. "Training object detectors from few weakly-labeled and many unlabeled images." Pattern Recognition 120 (Year: 2021).*

* cited by examiner

*Primary Examiner* — Stephen R Koziol
*Assistant Examiner* — Dylan J Sherrillo
(74) *Attorney, Agent, or Firm* — Knobbe, Martens, Olson & Bear, LLP

(57) ABSTRACT

Systems and methods are provided for efficiently building an object detection learning model for an unlabeled pool of images. A recommendation engine automatically recommends an annotation type for the images in the unlabeled pool based on previous object detection and an updated mean average precision of the model, where the mean average precision represents the performance of the model.

20 Claims, 8 Drawing Sheets

100

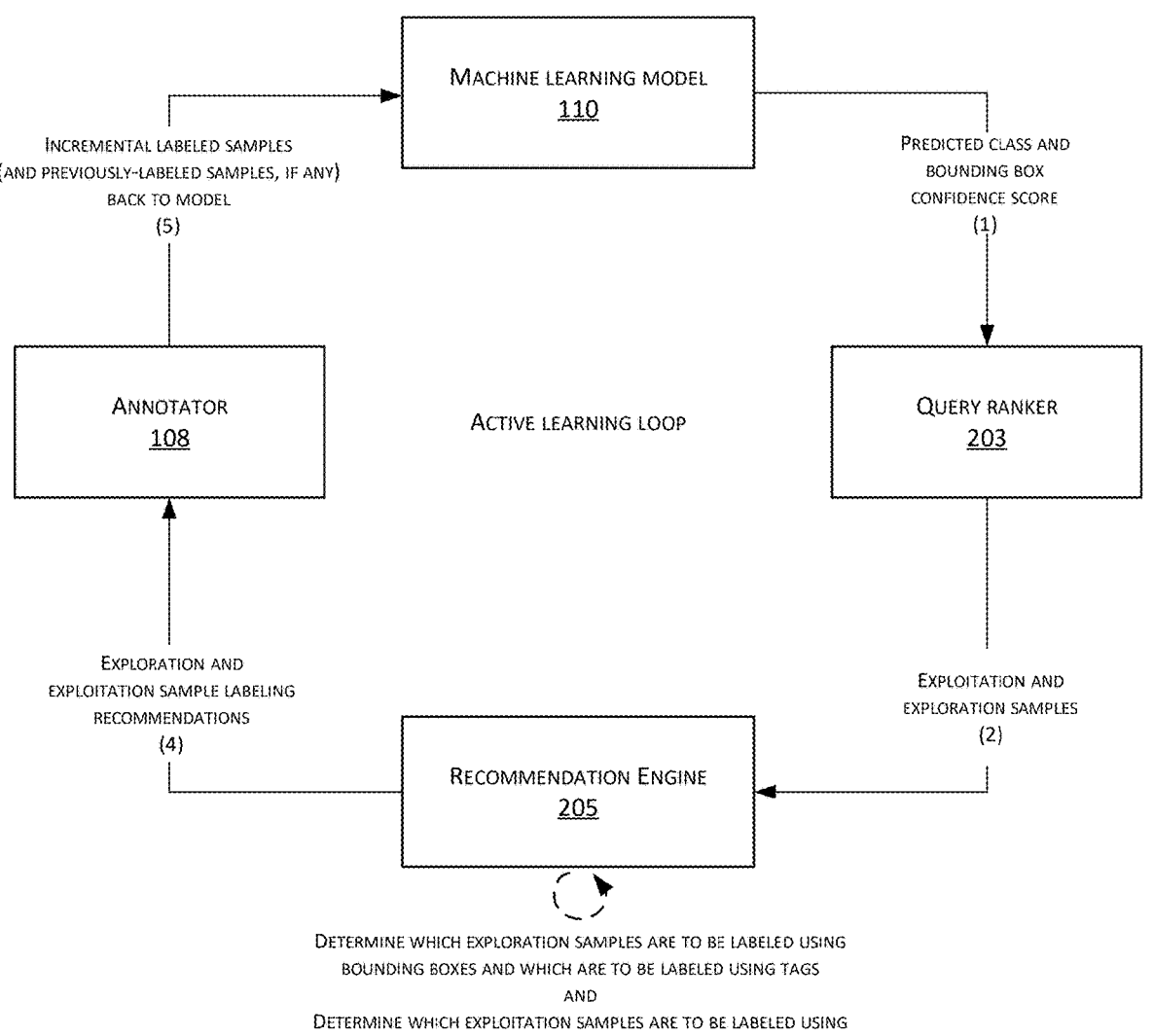

MACHINE LEARNING MODEL
110

INCREMENTAL LABELED SAMPLES
(AND PREVIOUSLY-LABELED SAMPLES, IF ANY)
BACK TO MODEL
(5)

PREDICTED CLASS AND
BOUNDING BOX
CONFIDENCE SCORE
(1)

ANNOTATOR
108

ACTIVE LEARNING LOOP

QUERY RANKER
203

EXPLORATION AND
EXPLOITATION SAMPLE LABELING
RECOMMENDATIONS
(4)

EXPLOITATION AND
EXPLORATION SAMPLES
(2)

RECOMMENDATION ENGINE
205

DETERMINE WHICH EXPLORATION SAMPLES ARE TO BE LABELED USING
BOUNDING BOXES AND WHICH ARE TO BE LABELED USING TAGS
AND
DETERMINE WHICH EXPLOITATION SAMPLES ARE TO BE LABELED USING
BOUNDING BOXES AND WHICH ARE TO BE LABELED USING TAGS
(3)

*Fig. 2*

QUERY RANKER
203

ANNOTATOR
108
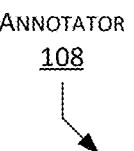
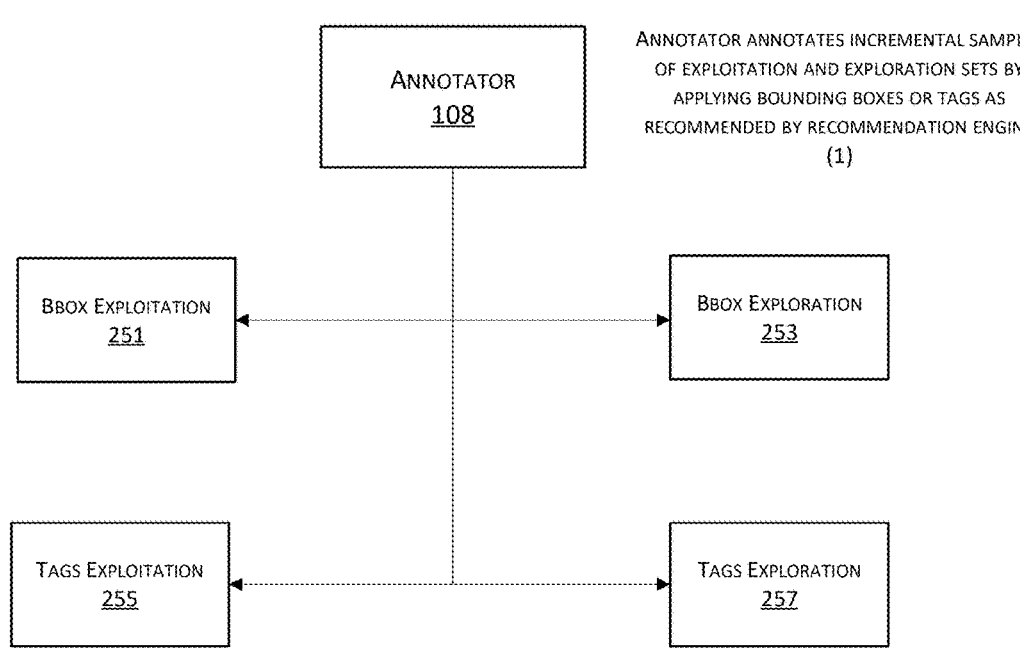
*Fig. 6*

300

302 — OBTAIN A SET OF UNLABELED IMAGES

304 — PERFORM OBJECT DETECTION ON SET OF UNLABELED IMAGES TO OUTPUT POSITIVE CLASS CONFIDENCE SCORE

306 — DETERMINE ENTROPY SCORE FOR INDIVIDUAL DETECTED IMAGES BASED ON POSITIVE CLASS CONFIDENCE SCORE

308 — RANK IMAGES BASED ON ENTROPY TO IDENTIFY EXPLOITATION SAMPLES

310 — DETERMINE TYPE OF LABEL (E.G., BOUNDING BOX OR TAG) FOR RANDOMLY-IDENTIFIED EXPLORATION SAMPLES BASED ON BOUNDING BOX COUNT AND WEIGHT FOR THE SAMPLES, AND REMOVE THE SAMPLES FROM THE SET OF UNLABELED IMAGES

312 — DETERMINE TYPE OF LABEL (E.G., BOUNDING BOX OR TAG) FOR EXPLOITATION SAMPLES SELECTED FROM REMAINING UNLABELED IMAGES BASED ON ENTROPY RANKING, THE TYPE OF LABEL DETERMINED BASED ON BOUNDING BOX COUNT AND WEIGHT FOR THE SAMPLES

314 — OBTAIN IMAGE LABELS BASED ON DETERMINED LABEL TYPES

316 — TRAIN A MODEL USING OBTAINED IMAGE LABELS

318 — CALCULATE MEAN AVERAGE PRECISION USING A VALIDATION DATA SET AND THE TRAINED MODEL, AND RECALCULATE BOUNDING BOX WEIGHT

320 — UNLABELED IMAGES REMAINING?

No

Yes

322 — END ROUTINE

324 — UPDATE UNLABELED POOL TO EXCLUDE LABELED IMAGES

*Fig. 7*

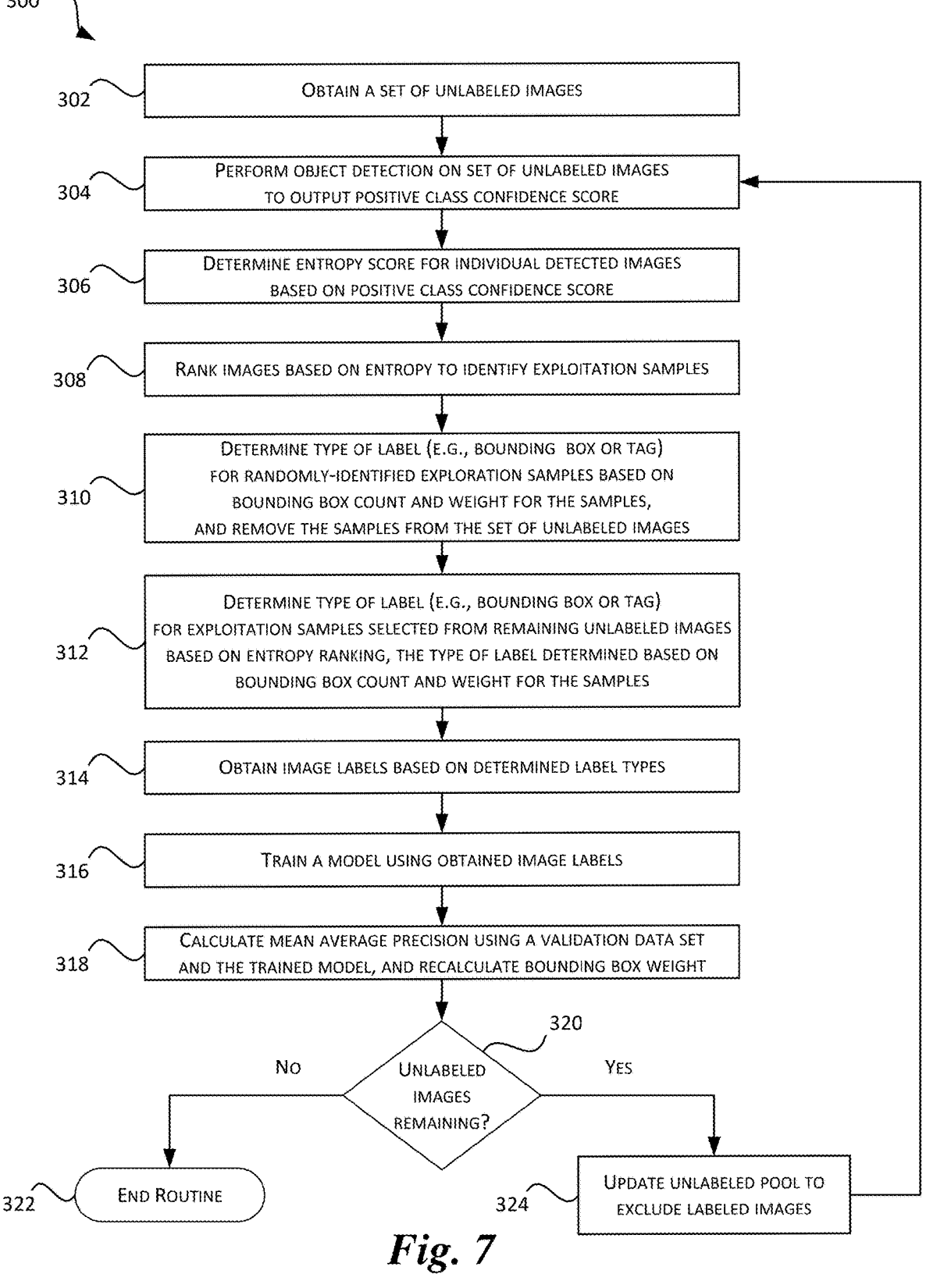

MULTI-MODAL OMNI-ANNOTATION

BACKGROUND

Computing systems can utilize image annotation for object detection to determine, identify, verify, or locate instances of objects in an image. Image annotation is the process of labeling images in order to train machine learning (ML) models, which may be used for object detection. In one example, individual objects depicted in an image may be labeled with bounding boxes, which describe the spatial location of the respective objects within the image. In another example, images may be labeled with class labels (e.g., tags), which assign relevant classes to the object(s) depicted in the images.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 2 is a block diagram of an illustrative embodiment of an active learning loop implemented by a model training system.

FIG. 6 is a block diagram of an embodiment of an annotator which annotates image samples according to the recommendation engine.

FIG. 7 is a flow diagram illustrative of a routine for determining recommended label types for image samples and training a model based on the recommendation according to some embodiments.

DETAILED DESCRIPTION

Figure 1:
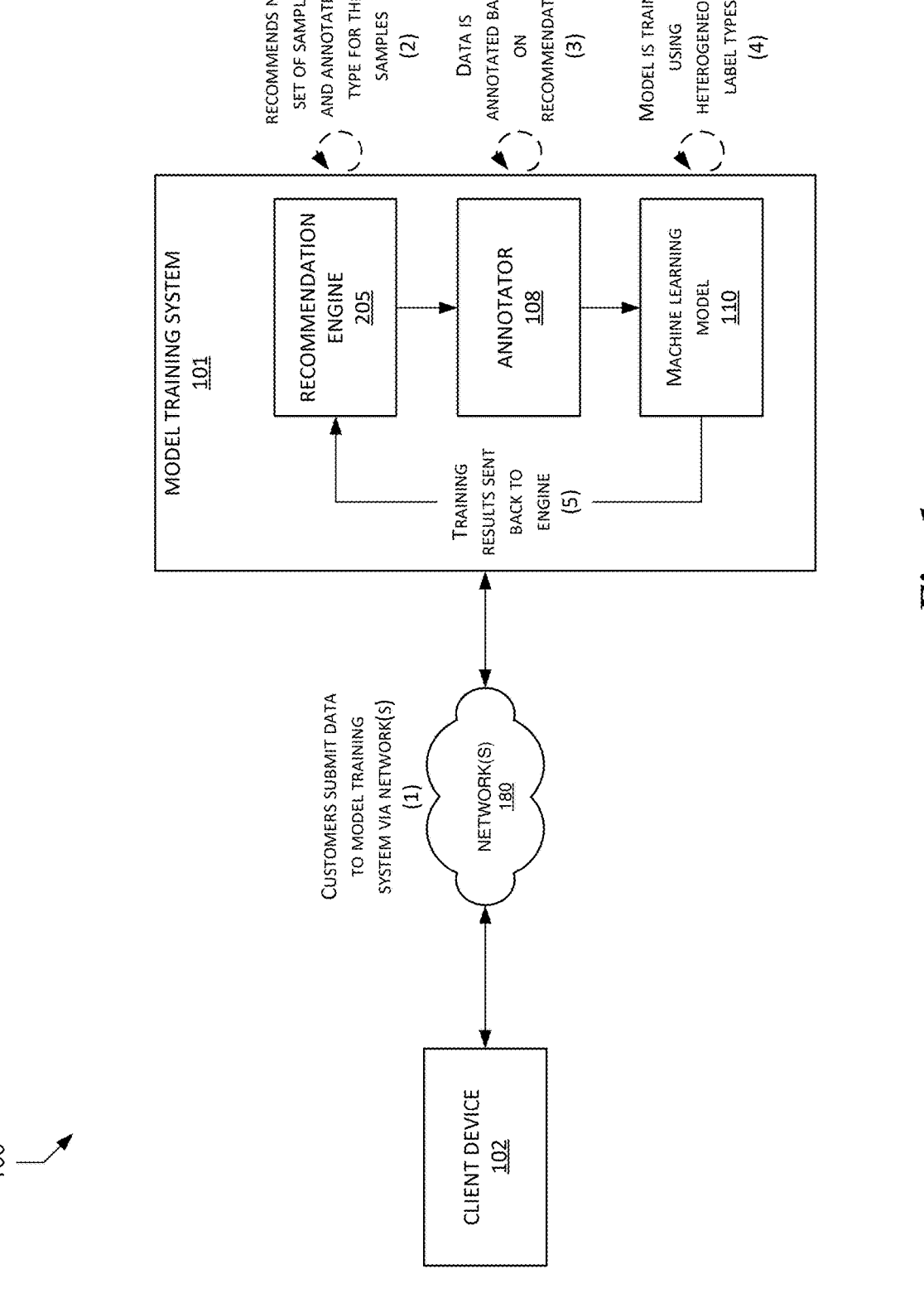
FIG. 1 is a block diagram depicting an illustrative embodiment in which a model training system may be implemented according to some embodiments.

Generally described, the present disclosure relates to a machine learning (ML) based object detection system that implements an active learning loop to iteratively evaluate training images and automatically recommend annotation types for labeling the training images in an efficient manner. Some types of annotations tend to result in accurate training for localized object detection within images but are relatively resource-intensive to produce, such as bounding boxes. Other types of annotations may not contribute to localized objection detection to the same degree, but are also relatively less resource-intensive to produce, such as class labels (e.g., tags). The system iteratively works through a set of unlabeled set of training images by obtaining annotations for portions of the set, and using the obtained annotated images to train an object detection model. Based on the performance of the model in training, the system automatically designates a portion of the remaining unlabeled images to be labeled with relatively resource-intensive annotations and a portion to be labeled with relatively less resource-intensive types of annotations. The process is repeated until a desired stopping point is reached (e.g., until all images in the training set have been annotated and used in training). This iterative, dynamic, performance-based determination of the types of annotations to be obtained can reduce resource requirements and improve efficiency in annotating training images and training object detection models.

Introduction

Image annotation has numerous real-world applications, ranging from content moderation and self-driving cars to security and surveillance. The annotation process (also referred to herein as "labeling"), encompassing classification, detection, and segmentation, is fundamental for generating high-quality data for model training. Training data annotation, particularly for object detection tasks that involve drawing bounding boxes around objects depicted in training images, is known to be a costly and resource-intensive process. For instance, it may take roughly 10-35 seconds to produce a bounding box for an object depicted in an image. A variety of strategies have been developed to reduce these costs, such as interpolating annotations between video frames or machine prediction with subsequent human verification (e.g., semi-supervised learning). Additionally, some approaches aim to streamline the bounding box annotation process by proposing the use of, for example, relatively loose bounding boxes or nearcenter points.

Omni-supervised learning is a more general form of semi-supervised learning. Omni-supervised learning allows for training a model using various available annotation types (also referred to herein as label types), such as a combination of tags and bounding boxes. The aim of omni-supervision is to leverage cheaper forms of annotation, when possible, to improve labelling efficiency when doing so will not impact (or significantly impact) accuracy. Numerous approaches have been proposed to take advantage of omni-supervision. For example, some object detectors have been trained using the Common Objects in Context (COCO) detection dataset containing bounding boxes and the ImageNet dataset containing tags, which enables the detector to predict object classes that lack labeled detection data.

Another method is a unified framework for omni-supervised object detection capable of handling several forms of annotations, such as tags, points, and scribbles. With this method, the annotation policy may have preset ratios of bounding boxes to tags, such as 80% budget on boxes and 20% on points, 50% budget on both, and 20% budget on boxes and 80% on points.

A mixture of different annotation types can lead to a better trade-off between annotation cost and classification accuracy. However, clear guidance on what type of annotation should be assigned to the next unlabeled data requiring annotation is still lacking, particularly for localization (e.g., object detection) objectives. Moreover, no conventional system provides dynamic adjustment of the proportion of different types of annotations to obtain during the training process itself.

Some aspects of the present disclosure address some or all of the issues noted above, among others, by utilizing an adaptive automated recommendation engine that considers the localization performance currently achieved during training, along with the characteristics of the images used in training, to recommend the type of annotation to be obtained for an unlabeled image. The recommendation engine can be employed in an active learning loop to guide annotators on which of various types of annotations are to be provided to achieve training that is both efficient and accurate. This recommendation engine helps achieve a substantial reduction in annotation resource requirements, while largely preserving the localization performance.

One aspect of the disclosure provides a multi-modal omni-annotation object detector (MMOA) capable of training using heterogeneous label types such as tags and bounding boxes, as well as multi-modal data including images and text captions. This is achieved using a novel localization loss function. Another aspect of the disclosure provides an automated recommendation engine that determines the next annotation type(s) to be obtained to train the machine learning model, resulting in an improved annotation resource-usage vs localization accuracy trade-off.

Image annotation using the systems and methods described herein, and the resulting object detection models trained using the annotated images, can be used for a variety of purposes. With reference to one specific, non-limiting example, an object detection model can be used for the detection of offensive flags or other objects of interest in an image. In this example, the recommendation engine may recommend for some training images that a bounding box annotation be depicted around the specific object(s) of interest (e.g., offensive flags in the image), showing with some level of precision where the object(s) is/are located in the image. For other training images, the recommendation engine may recommend that a tag annotation be added, where the tag is a classification of the images as, for example, including or not including an offensive object or other object of interest.

Various aspects of the disclosure will be described with regard to certain examples and embodiments, which are intended to illustrate but not limit the disclosure. Additionally, any feature used in any embodiment described herein may be used in any combination with any other feature or in any other embodiment, without limitation.

Overview of Example Model Training System

With reference to an illustrative embodiment, FIG. 1 shows an example computing environment 100 in which features of the present disclosure may be implemented. As shown, the computing environment includes client device 102, a network(s) 180, such as an intranet or the Internet, and a model training system 101, which are implemented using a computing device or devices, such as the computing device depicted in FIG. 8. In some embodiments, the model training system 101 may include: a recommendation engine 205, a machine learning model 110, and an annotator 108.

The client device 102 is in communication with the model training system 101 via a network(s) 180, such that customers may submit data to the model training system 101 using the client device 102, as depicted at (1). Such data may include unlabeled image data or other data for object detection. For example, a user may use the client device 102 to submit a collection of unlabeled images for the model training system 101 to be used to train a machine learning model. The model training system 101 can use the efficient annotation methods and operations described herein to obtain annotations for the images and train the model.

The recommendation engine 205 may be a system that recommends the type of annotation to acquire for each image in the data set. The recommendation engine 205 can be adaptive and consider current achieved localization performance, along with the characteristics of an image, to recommend the type of annotation to label with for an unlabeled image. The recommendation engine 205 can be employed in an active learning loop to guide annotators on the appropriate type of annotation.

At (2), the recommendation engine 205 can recommend the next set of samples and the annotation type (e.g., bounding box or tag) for individual images in the customer submitted dataset, or for a subset thereof. The method by which the recommendation engine 205 determines which annotation type to recommend will be discussed in further detail below. The recommendation engine 205 can determine a recommended annotation type for an image. In some embodiments, the recommendation is based on the entropy score of each image on which object detection has been performed. Then the recommendation engine 205 can suggest the next annotation type to label the image with to train the machine learning model 110.

The annotator 108 may annotate (e.g., label) the customer data based on the recommendation from the recommendation engine 205 at (3). For example, the recommendation engine 205 may recommend that certain images be labeled with bounding box annotation and that other images may be labeled with tag annotation. The annotator 108 may annotate the specified images with bounding boxes or tags per the recommendation.

The machine learning model 110 trains a model using heterogeneous label types such as tags and bounding boxes at (4). The machine learning model 110 can also train the model using multi-modal data including images and text captions. This may be achieved using a multi-modal localization loss function. In some embodiments, the multi-modal localization loss function calculation is a two-step process. First, the loss function may use the Hungarian Matching algorithm to produce an optimal bipartite matching between predicted and ground truth annotations. Second, the loss function may suppress and scale localization loss for samples that do not have bounding box annotations.

At (5) the results of the training of the model are sent back to the recommendation engine 205. The training results are used by the recommendation engine 205 to improve its annotation type recommendations. As such, the recommendation engine 205 can gradually make better recommendations as it receives more training results. Steps 2-5 may loop until one or more stopping criteria is/are met (e.g., all the training data has been labeled and used, a certain number of iterations have been completed, an accuracy threshold is reached, or a stop command is received).

Example MMOA Framework

FIG. 2 is a block diagram of an illustrative embodiment of an active learning loop implemented by a model training system. The loop iterates through the machine learning model 110, the query ranker 203, the recommendation engine 205, and the annotator 108. Further detail of each component will be provided below with respect to FIGS. 3-6.

Figure 3:
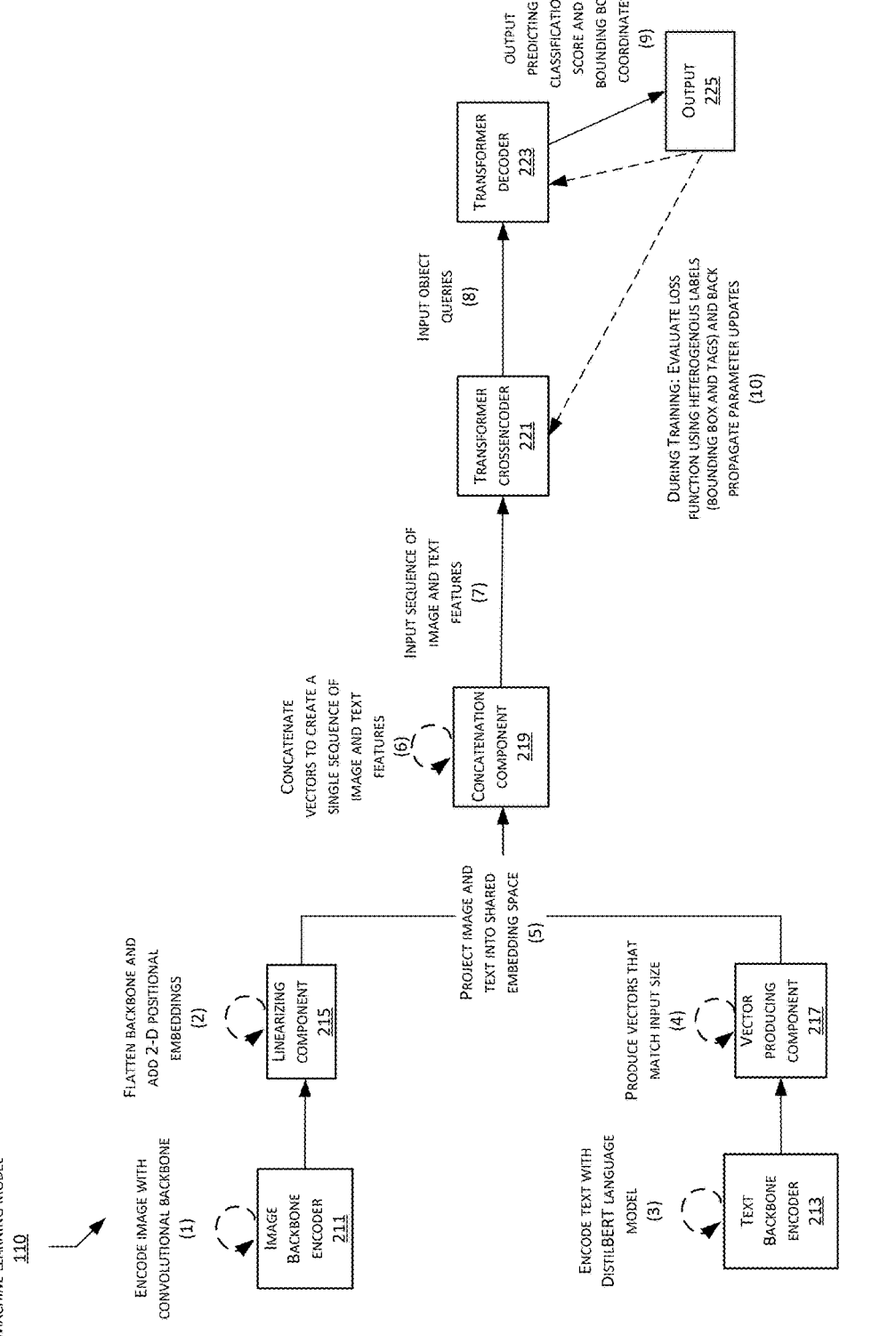
FIG. 3 is a block diagram illustrating an embodiment of a machine learning model architecture for image object detection.

The machine learning model 110 comprises a system for conducting object detection on images. The specific machine learning model architecture mentioned in FIGS. 2-3 is just one embodiment. There may be several other possible structures for other embodiments, such as neural networks, convolutional neural networks, vision transformers, etc.

The machine learning model 110 sends predicted class and bounding box confidence scores for each image to the query ranker 203 at (1). Predicted class and bounding box confidence scores represent the level of accuracy for object detection output for each corresponding prediction type (e.g., predicted class or bounding box). Each image may have a confidence score representing the level of accuracy for the object detection output for the corresponding prediction type for the objects in that image. The prediction type may be predicted class (e.g., tag), bounding boxes, or both. Entropy can be obtained from the confidence scores, where entropy represents the amount of uncertainty in the data. For instance, if the model's confidence score for predicting an object is 0.5 on a scale of 0 to 1, then the model is least certain about this prediction. This score is considered to have high entropy (uncertainty). In contrast, if the confidence score is 0.1 or 0.9, then the model is most confident of 'no object' and 'object' respectively. These scores have low entropy.

The query ranker 203 ranks samples by entropy and determines which image samples may be used for the exploitation samples. In some embodiments, before selecting the exploitation samples, exploration samples are randomly selected from the pool of remaining unlabeled images. For example, the samples may be randomly selected using a pseudo-random number generator or another pseudo-random selection algorithm. The exploitation samples are selected based on the entropy ranking. The query ranker 203 sends the exploitation and exploration samples to the recommendation engine 205 at (2).

The recommendation engine 205 can determine which exploration samples are to be labeled using bounding boxes and which are to be labeled using tags, and can determine which exploitation samples are to be labeled using bounding boxes and which are to be labeled using tags at (3). Further detail with respect to how the recommendation engine 205 determines its recommendations can be found in the description of FIG. 5.

At (4), the recommendation engine 205 then sends the exploration and exploitation sample labeling recommendations to the annotator 108. The annotator 108 may annotate (e.g., label) the customer data based on the recommendations from the recommendation engine 205. For example, the recommendation engine 205 may recommend that certain images be labeled with bounding box annotation and that other images may be labeled with tag annotation. The annotator 108 may annotate the specified images with bounding boxes or tags per the recommendation.

The annotator 108 sends incremental (e.g., over time) labeled samples back to the machine learning model 110 at (5). The labeled samples may be used to further train and improve the model. The process can repeat continuously in an active learning loop to repeatedly improve the model until all customer data has been annotated and used to train the model, or until some other stopping criterion is met.

Example Machine Learning Model Architecture

FIG. 3 is a block diagram illustrating an embodiment of a machine learning model 110 for image object detection. The specific machine learning model architecture illustrated and described herein is just one embodiment. There may be several other possible structures for other embodiments, such as neural networks, convolutional neural networks, vision transformers, etc.

The example machine learning model 110 illustrated in FIG. 3 follows the Detection Transformer (DETR) method of object detection. However, DETR is only one example of object detection. In other embodiments, the machine learning model 110 may utilizes other methods of object detection, such as a Region-based Convolutional Neural Network (R-CNN), You Only Look Once (YOLO), etc. DETR is a method for object detection that approaches object detection as a direct set prediction problem. DETR is a known project and process (utilizing a Transformer encoder-decoder architecture, and outputting predictions in parallel), and thus need not be described in detail herein.

To begin object detection on an image, the image backbone encoder 211 encodes images with a convolutional backbone at (1). A backbone refers to a convolutional neural network that processes the image data into feature representation. As an example, the backbone may be a Mobile-Net-V2 convolutional backbone. The backbone allows the image to be represented as a set of image features as opposed to an image, which allows the machine learning model to digest the image information more easily for object detection.

A linearizing component 215 flattens the backbone and adds 2-D positional embeddings at (2). To flatten the backbone, the linearizing component 215 creates 2-D vectors of the backbone. The 2-D positional embeddings may then be added to the flattened vector to keep the spatial information of the backbone.

At (3), the text backbone encoder 213 encodes text with a pre-trained DistilBERT language model. DistilBERT is a known Transformer model that is trained by distilling the BERT base. BERT is a known family of language models for natural language processing. Encoding the text allows the text to be represented in a manner digestible to the model.

At (4), the vector producing component 217, produces vectors that match the input size of the text backbone. The result is a sequence of hidden vectors.

At (5), both the image and text features from (2) and (4) are projected into a shared embedding space with a modality dependent linear projection in order to ensure that these feature vectors can be concatenated on the sequence dimension to create a single sequence of image and text features. Then the concatenation component 219 can concatenate the vectors to create a single sequence of image and text features at (6). After linearizing component 215 and vector producing component 217 project the image and text vectors, the output vectors from each is concatenated and combined to store the key features learned in each that indicate the features of an image. The resulting data (e.g., concatenated vector or matrix) may then be reduced in size in an embedding process such that the relationship between the text and visual features identified in each processing branch and the associated image classes are stored and passed on to subsequent components of the model 110.

At (7), the single sequence of image and text features from (6) are inputted to a joint transformer encoder, depicted as the transformer crossencoder 221. The final hidden state of the crossencoder 221 and cross attention is used to input learnable object queries using a transformer decoder 223 at (8). The transformer decoder 223 can produce output 225 predicting a classification score and bounding box coordinates for an image at (9).

The description of the machine learning model 110 to this point relates to operation during either inference or training.

If the model 110 is being trained, there are additional operations that may be performed. For example, at (10) a loss function, such as the multi-modal localization loss function described above, can be evaluated using the output 225 and parameter updates are back propagated to the transformer crossencoder 221 and/or the transformer decoder 223.

Example Query Ranker

Figure 4:
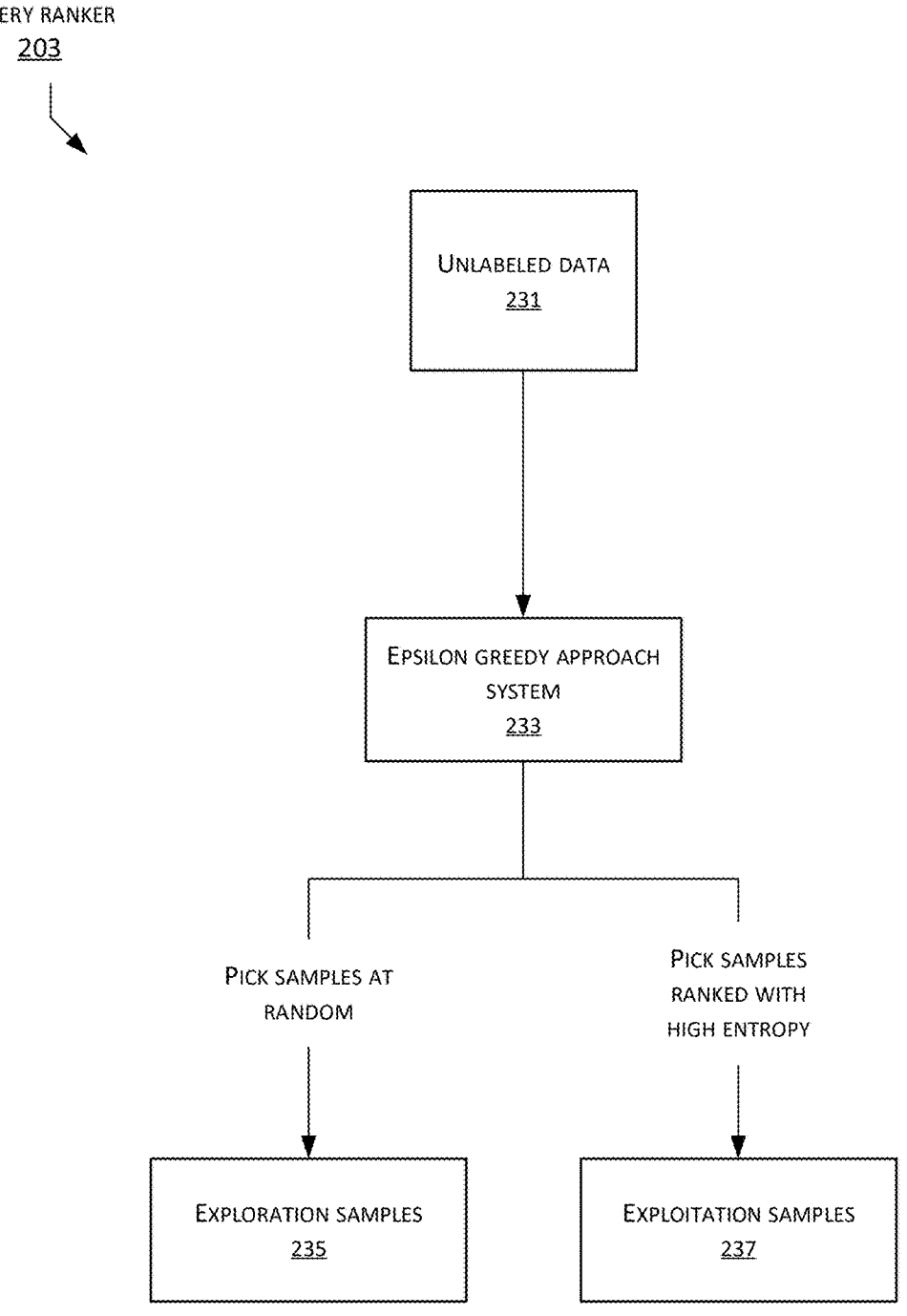
FIG. 4 is a block diagram of an embodiment of a query ranker for ranking image samples based on entropy.

FIG. 4 is a block diagram of an embodiment of the query ranker 203 for ranking unlabeled image samples based on entropy. In the illustrated example, the query ranker 203 first sets aside a random set of samples for exploration, then performs the entropy ranking to select the exploitation samples. However, the illustration is provided for purposes of example only, and is not intended to be limiting, required, or exhaustive. In some embodiments, the query ranker 203 may perform the operations in different a different sequence, in parallel, or asynchronously. In some embodiments, the query ranker 203 may perform fewer, additional, and/or alternative operations.

The query ranker 203 may begin with a pool of unlabeled data 231 containing unlabeled images or other data for object detection. The query ranker 203 randomly picks samples from the pool of unlabeled data to use for ranking. The number of randomly chosen samples may be predetermined or vary over time (e.g., from iteration to iteration of the active learning loop), depending on the total number of unlabeled samples remaining in the pool.

The samples (or a subset thereof) may be separated into exploitation samples 237 and exploration samples 235. The system may pick Nexplore samples at random from the unlabeled data 231 to use for the exploration samples 235, where Nexplore is a predetermined or dynamically determined quantity or percentage of the remaining unlabeled samples. Those samples are then no longer considered in the pool for the exploitation samples. However, this is not meant to be limiting or required, as in other embodiments, the selection of Nexplore samples may occur before or after the samples are ranked by entropy as discussed below.

The epsilon greedy approach system 233 can rank the samples from the chosen random samples by entropy. Generally described, epsilon greedy algorithms switch between exploitation and exploration samples, but typically focus on exploitation. Entropy represents the level of uncertainty for an image annotation type based on the confidence score (e.g., certainty that something is correctly annotated). In an embodiment, the samples may be ranked in decreasing order of entropy, where the highest amount of entropy indicates that the particular sample is the most uncertain. However, this is not meant to be limiting or required, as in other embodiments, other amounts of entropy may indicate the level of uncertainty for the samples (e.g., low amount of entropy indicates high level of uncertainty, etc.). The system can pick Nexploit samples with high entropy, where Nexploit is a predetermined or dynamically determined quantity or percentage of the remaining unlabeled samples. The selected samples can be allocated to the exploitation samples 237. Nexploit may be the same as, or different from, Nexplore. Typically, Nexplore+Nexploit<Nunlabeled, where Nunlabeled is the quantity of remaining unlabeled samples. During a last iteration of the active learning loop (e.g., when all remaining unlabeled samples are annotated and used to train the model), Nexplore+Nexploit may be >=Nunlabeled,

Example Recommendation Engine

Figure 5:
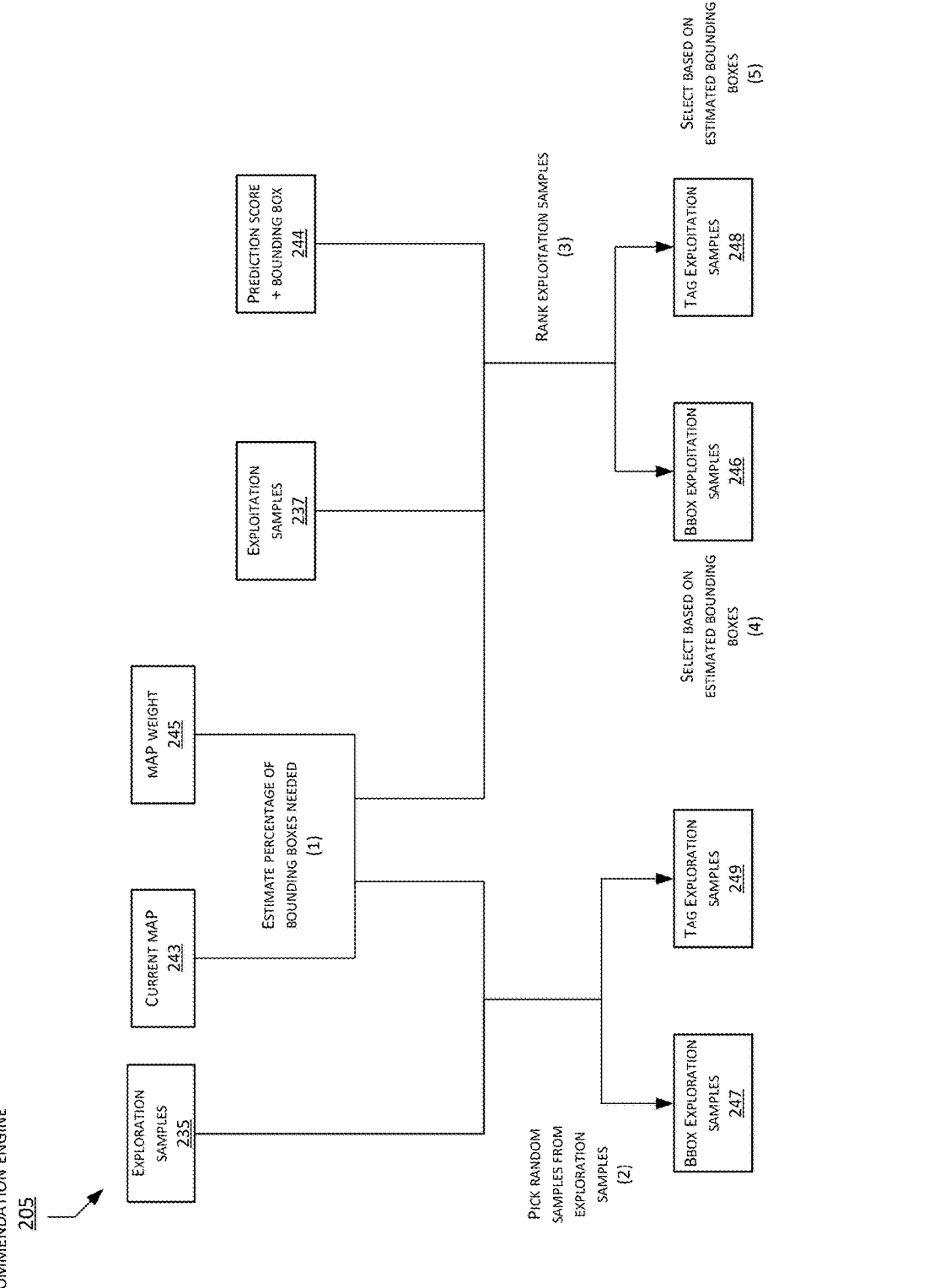
FIG. 5 is a block diagram of an embodiment of a recommendation engine which makes recommendations for labeling images with bounding boxes or tags.

FIG. 5 is a block diagram of an embodiment of the recommendation engine 205 which makes recommendations for labeling images with bounding boxes or tags. Using a current mean average precision (mAP) 243 and the mAP weight 245 (e.g., importance weight given to bounding box annotation), the recommendation engine 205 can determine an estimated percentage of bounding boxes needed for the exploration samples at (1).

The mAP 243 may be calculated based on how precise the model performs object detection and may be updated over time using validation data. For example, the current performance of the machine learning model 110—in terms of mAP—during the latest iteration of the active learning loop may be determined based on a validation data set.

The mAP weight 245 (importance weight) may be a parameter to tune how aggressive the system should be to obtain tag annotations versus bounding box annotations. The mAP weight 245 may be configured or adjusted by an end-user. The mAP weight 245 may be a means of weighting the mAP 243 so as to adjust the amount of obtained tag annotations or bounding box annotations, which may correlate to the cost versus accuracy of the model. For example, the larger the importance weight and the lower the achieved mAP is, the larger the number of bounding box annotations the system will recommend. In this example, the larger importance weight indicates a lower cost at the expense of accuracy (e.g., lower achieved mAP) which results in a larger number of bounding box annotations.

Using the exploration samples 235 as obtained in FIG. 4, the current mAP 243, and the mAP weight 245, the system can determine which of the exploration samples 235 are to be labeled with bounding boxes, depicted as bounding box exploration samples 247, and which samples are to be labeled with tags, depicted as tag exploration samples 249. The respective quantities of box exploration samples 247 and tag exploration samples 249 are determined based on the current mAP 243 and the mAP weight 245 The individual bounding box exploration samples 247 and the tag exploration samples 249 are chosen at random from the exploration samples at (2).

In some embodiments, the percentage of samples to be labeled with bounding boxes can be estimated using the mAP 243 and a target mAP. The target mAP may be specified by an end user or predetermined in the system to represent the mAP that the model should strive to achieve. The percentage may be calculated by taking the max of either 0 or the difference of the mAP 243 subtracted from the mAP weight 245 and dividing the max result by the target mAP (e.g., max(0, weight-mAP)/target). The percentage can be used to portion out the bounding boxes versus tag subsets of the exploration set. For example, if the percentage is calculated as 40%, the portion of samples to be labeled with bounding boxes in the exploration set will be 40% of the samples in the set and the portion of samples to be labeled with tags in the exploration set will be 60% of the samples in the set.

The exploitation samples 237 are ranked at (3) based on the prediction score and bounding boxes 244. More specifically, the ranking is based on the number of bounding boxes predicted in each sample. Exploitation samples 237 are selected as the bounding box exploitation samples 246 based on the ranking at (4). For example, the bounding box exploitation samples 246 may be selected based on a high ranking (e.g., high number of bounding boxes). The machine learning model 110 is used to predict the quantity of objects of interest—and therefore the quantity of bounding boxes—in the images. Images with more bounding boxes may be favored over those with fewer bounding boxes. Specifically, for example, it is lower cost with a higher value for an annotator to add n bounding boxes to one image as opposed to just one bounding box to for one n images (e.g., more objects detected in a single image).

On the other hand, exploitation samples 237 may be selected as the tag exploitation samples 248 at (5) based on the ranking. For example, the tag exploitation samples 248 may be selected based on a low ranking (e.g., low number of bounding boxes).

Similar to exploration samples, the number of samples selected as bounding box versus tag exploitation samples may be based on the percentage of samples to be labeled with bounding boxes using the mAP 243, mAP weight 245, and a target mAP. The ranked samples can be selected according to the calculated percentage. For example, if the percentage is calculated as 40%, the top 40% of ranked samples are to be labeled with bounding boxes and the bottom 60% of ranked samples are to be labeled with tags. However, this is not meant to be limiting or required. The ranking may be based on another determination related to the bounding boxes but is not limited to a specific number of bounding boxes.

Example Annotator

FIG. 6 is a block diagram of an embodiment of an annotator 108 which annotates image samples according to the recommendation engine. The annotator 108 annotates incremental samples of exploitation and exploration sets by applying bounding boxes or tags as recommend by recommendation engine at (1). The exploitation samples that are to be labeled with bounding boxes are depicted as bounding box exploitation 251. The exploitation samples that are to be labeled with tags are depicted as tags exploitation 255. The exploration samples that are to be labeled with bounding boxes are depicted as bounding box exploration 253. The exploration samples that are to be labeled with tags are depicted as tags exploration 257. In the next iteration of the system, these now labeled samples can be excluded from the considered pool of unlabeled data.

Example Routine

FIG. 7 is a flow diagram illustrative of a routine 300 for determining recommended label types for image samples and training a model based on the recommendations according to some embodiments. Generally described, the routine 300 includes performing object detection on unlabeled images, determining images to be annotated with bounding boxes or tags, obtaining the annotations, and training a model based on the annotated images. By using this routine, a system may more efficiently conduct object detection on images in comparison with various other systems, such as systems that obtain bounding boxes for all images, or systems that obtain a static quantity or portion of bounding box annotations vs. tag annotations.

The routine 300 may begin automatically upon initiating a device (e.g., a model training system 101), or may be initiated by a client or end-user on an ad hoc basis. The client or end-user may use an interactive system to initiate the routine 300. For example, a client or end-user may request the object detection when desired by the client or end-user using the interactive system. The routine 300 may also be initiated automatically based on a routine schedule (e.g., every hour, day, or week, etc.), in response to a triggering event, or both. For example, a routine schedule may set the routine 300 to automatically be performed every week and therefore, the routine 300 may be performed every week according to the set schedule. Additionally, a triggering event, for example, may be an added data event, etc., where an event occurrence in the network triggers initiation of the routine 300.

The routine 300 may be embodied in a set of executable program instructions stored on a computer-readable medium, such as one or more disk drives of a computing system of a node or a server. When the routine 300 is initiated, the executable program instructions can be loaded into memory, such as random access memory ("RAM"), and executed by one or more processors of a computing system, such as the model training system 101 shown in FIG. 8.

At block 302, a computing device executing the routine 300 (e.g., the model training system 101), obtains a set of unlabeled images. These unlabeled images may come from a client device or be already existing in the system.

At block 304, object detection is performed on the set of remaining unlabeled images (e.g., the unlabeled images remaining after prior iterations of routine 300 on the set of unlabeled images obtained at block 302). The object detection results in an output of positive class confidence scores, along with the bounding box estimated coordinates. The positive class confidence score indicates the likelihood that an object is correctly classified in a particular class, or estimated level of accuracy in the object detection and classification. The confidence score may be represented by a number between 0 and 1. However, this is meant as an example only and is not meant to be limiting. The bounding box estimated coordinates are the object detection model's estimation of where the objects are located in the image.

At block 306, an entropy score for each detected image is determined based on the positive class confidence score. Entropy represents the amount of uncertainty for an object detection output. For example, entropy may be the inverse of the positive class confidence score. In that case, where the confidence score is low, the entropy for the image would be high and vice-versa.

At block 308, the unlabeled images are ranked based on the determined entropy scores. In an embodiment, the detected images may be ranked in decreasing order of entropy, where the highest amount of entropy indicates that the particular image has the most uncertainty. However, this is not meant to be limiting or required, as in other embodiments, other amounts of entropy may indicate the level of uncertainty of the images (e.g., low amount of entropy indicates high level of uncertainty, etc.). In some embodiments, as discussed below, the ranking is used to identify exploitation samples. The number of exploitation samples may vary from iteration-to-iteration of the routine 300, or may be preset to a certain number or percentage of remaining unlabeled samples. In an embodiment, the samples with the highest entropy are chosen as the exploitation samples. However, this is not meant to be limiting or required, as in other embodiments, samples with other amounts of entropy may be chosen as the exploitation samples.

At block 310, the computing device executing the routine 300 randomly identifies a set of samples to be used as exploration samples, and removes those samples from the set of unlabeled images. The number of randomly identified exploration samples may vary from iteration-to-iteration of the routine 300, or may be preset to a certain number or percentage of remaining unlabeled samples. Although the exploration samples are shown as being identified after the samples are ranked by entropy, this is not meant to be limiting or required. In another embodiment, the exploration samples may be identified before or after block 304, block 306, or block 308.

The exploration samples are removed from the set of unlabeled images as to be used for a different process of recommending annotation types. The exploration samples may then be separated into one subset to be annotated with bounding boxes, and another subset to be annotated with class tags. Exploration samples to be labeled with bounding box annotation are chosen randomly according to a calculated estimated percentage of samples to be labeled with bounding boxes. The estimated percentage is calculated based on the target mean average precision (mAP), current mAP, and the importance weight given to bounding box annotation. The importance weight may be a parameter to tune how aggressive the system should be to obtain tags versus bounding boxes. For example, the larger the importance weight and the lower the achieved mAP is, the larger the bounding box estimate. The exploration samples are then updated to exclude the exploration samples to be labeled with bounding boxes. The remaining samples are to be labeled with tag annotation.

At block 312, a set of exploitation samples is selected from the remaining unlabeled images. The set of exploitation samples may be selected based on the entropy determined above (e.g., a quantity of unlabeled images with the highest entropy). Each of the unlabeled images in the exploitation set is separated into a first subset to be labeled with bounding boxes or a second subset to be labeled with class tags based on the bounding box count and importance weight. The quantity of exploitation samples to be labeled with bounding box annotation is based on a calculated estimated percentage using the target mean average precision (mAP), current mAP, and the importance weight given to bounding box annotation. The exploitation samples are then updated to exclude the exploitation samples to be labeled with bounding boxes. The remaining samples are randomly chosen to be labeled with tag annotation.

In some embodiments, an unlabeled image is determined to be labeled with bounding boxes based on a number of bounding boxes predicted to be in the image and according to the importance weight. As an example, unlabeled images in the exploitation set may be determined to be labeled with bounding boxes for samples with a high number of bounding boxes according to the ranking where the weight is used to determine the percentage of images to be labeled with tags versus bounding boxes.

In some embodiments, an unlabeled image is determined to be labeled with tags for samples with a certain number of bounding boxes. As an example, unlabeled images in the exploitation set may be determined to be labeled with tags for samples with a low number of bounding boxes according to the ranking.

At block 314, image labels are obtained based on the determined label type (e.g., bounding boxes or tags) from blocks 310 and 312. In some embodiments, images may be labeled by human annotators according to the determination.

At block 316, an MMOA model is trained with the obtained image labels. The model is trained as to improve the annotation cost and localization accuracy for future iterations, as described in greater detail above.

At block 318, an updated mAP is calculated based on validation data using the trained MMOA and the bounding box weight is recalculated. The validation data may be a set of labeled data that indicates the correct labeling of images. The mAP may be calculated based on how closely the validation data matches data resulting from the trained MMOA. The bounding box weight can be recalculated based on the trained model. The updated mAP and bounding box weight may then be used in future iterations of the routine 300.

At decision block 320, the system may determine whether there are unlabeled images remaining in the pool. If yes, the routine 300 proceeds to block 324. Otherwise, the routine 300 may terminate at block 322.

At block 324, the unlabeled pool is updated to exclude the now labeled images from the exploration samples and the exploitation samples. With the updated unlabeled pool, the routine continues back to block 304 to repeat the routine until no unlabeled images remain.

Example Network Analysis System

Figure 8:
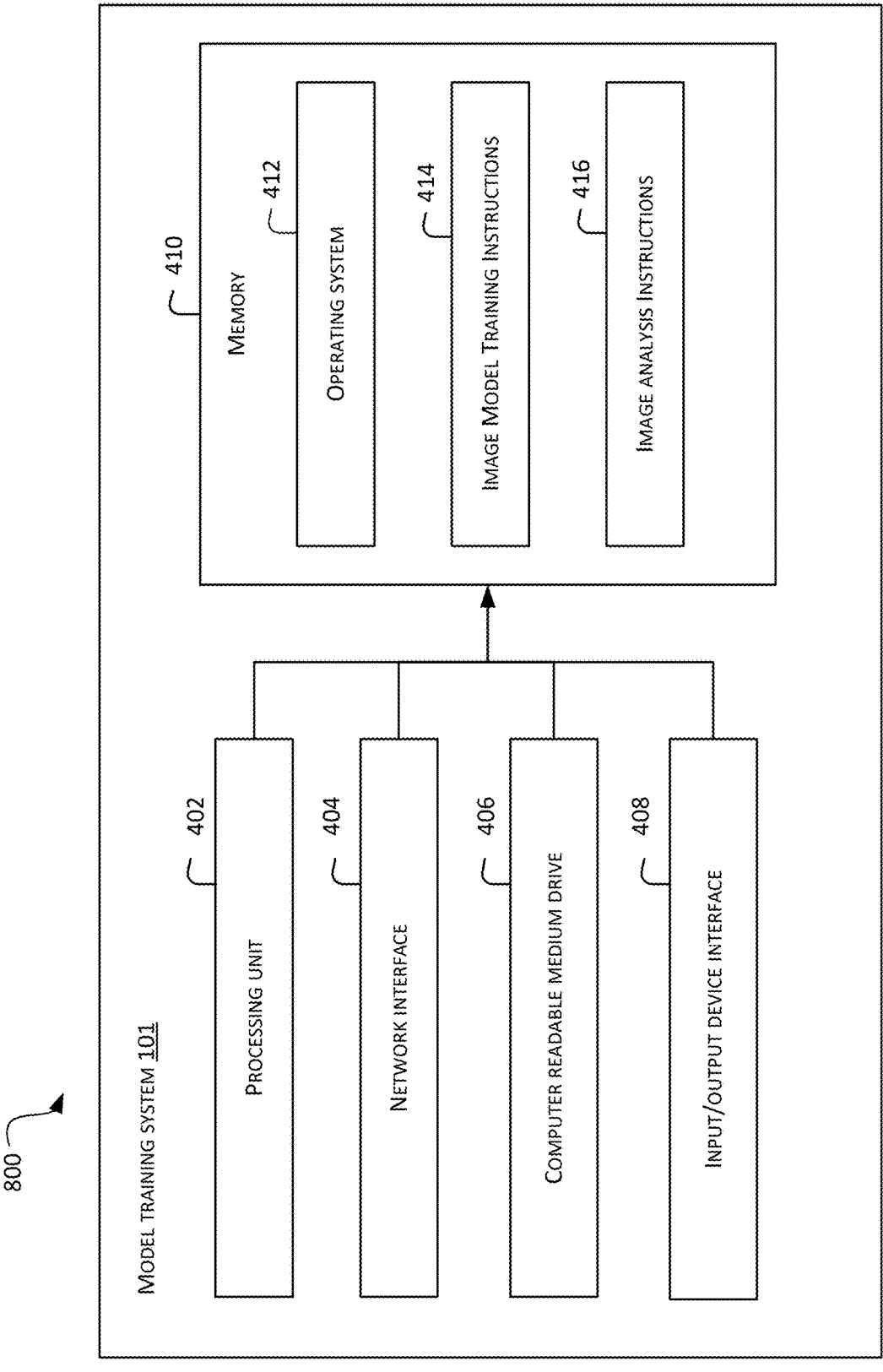
FIG. 8 shows an example computing device that may be used to implement aspects of the present disclosure.

FIG. 8 illustrates an example computing device 800 used to implement the model training system 101 and configured to execute the processes and implement the features described above. In some embodiments, the model training system 101 may include: one or more computer processors 402, such as physical central processing units ("CPUs"); one or more network interfaces 404, such as a network interface card ("NIC"); one or more computer readable medium drives 406, such as a high density disk ("HDD"), a solid state drive ("SSD"), flash drives, and/or other persistent non-transitory computer-readable media; an input/output device interface 408, such as an input output ("IO") interface in communication with one or more microphones; and one or more computer readable memories 410, such as RAM and/or other volatile non-transitory computer-readable media.

The network interface 404 can provide connectivity to one or more networks or computing systems. The computer processor 402 can receive information and instructions from other computing systems or services via the network interface 404. The network interface 404 can also store data directly to the computer readable memory 410. The computer processor 402 can communicate to and from the computer readable memory 410, execute instructions and process data in the computer readable memory 410, etc.

The computer readable memory 410 may include computer program instructions that the computer processor 402 executes in order to implement one or more embodiments. The computer readable memory 410 can store an operating system 412 that provides computer program instructions for use by the computer processor 402 in the general administration and operation of the model training system 101. The computer readable memory 410 can further include computer program instructions and other information for implementing aspects of the present disclosure. For example, in one embodiment, the computer readable memory 410 may include image model training instructions 414. As another example, the computer readable memory 410 may include the image analysis instructions 416. In some embodiments, multiple model training systems 101 may communicate with each other via their respective network interfaces 404, and can implement multiple sessions each session with a corresponding connection parameter (e.g., model training system 101 may execute one or more separate instances of the routine 300), in parallel (e.g., each model training system 101 may execute a portion of a single instance of a routine 300), etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only memory ("ROM"), erasable programmable read-only memory ("EPROM"), electrically erasable programmable read-only memory ("EEPROM"), registers, hard disk, a removable disk, a compact disc read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:

computer-readable memory; and one or more processors in communication with the computer-readable memory and programmed by executable instructions to:

receive a request from a client device to train a machine learning model, wherein the request comprises a set of unlabeled customer images to train the machine learning model;

obtain a first set of unlabeled training images from the set of unlabeled customer images;

remove a first set of exploration samples from the first set of unlabeled training images to create a second set of unlabeled training images;

process the second set of unlabeled training images using the machine learning model to generate a plurality of object detection outputs, wherein the plurality of object detection outputs comprises a classification and a confidence score for each image, wherein the confidence score represents an estimated level of confidence in the classification for each image;

determine a first ranking of the second set of unlabeled training images based on an entropy score for each image in the second set of unlabeled training images, representing the confidence score for image;

identify a set of exploitation samples based on the first ranking;

process the set of exploitation samples using the machine learning model to generate a set of one or more bounding boxes for each image of the set of exploitation samples;

determine a second ranking of the set of exploitation samples based on a number of bounding boxes for each image of the set of exploitation samples;

identify a first portion of the set of exploitation samples to be labeled with bounding box annotation based on the second ranking and results of a prior iteration of training the machine learning model;

identify a second portion of the set of exploitation samples to be labeled with tag annotation based on the second ranking;

obtain a set of labeled training images, wherein a first portion of the set of labeled training images corresponds to first portion of the set of exploitation samples, and wherein a second portion of the set of labeled training images corresponds to the second portion of the set of exploitation samples;

train the machine learning model using the set of labeled training images; and provide the trained machine learning model to the client device.

2. The system of claim 1, wherein the one or more processors are programmed by further executable instructions to:

remove the set of exploitation samples from the second set of unlabeled training images to create a third set of unlabeled training images;

verify the third set of unlabeled training images comprises at least one or more images; and process the third set of unlabeled training images using the machine learning model to generate a second plurality of object detection outputs.

3. The system of claim 1, wherein the one or more processors are programmed by further executable instructions to:

determine at random a first portion of the first set of exploration samples to be labeled with bounding boxes and a second portion of the first set of exploration samples to be labeled with tags; and identify a second set of exploration samples comprising one or more unlabeled samples in the first set of exploration samples.

4. The system of claim 1, wherein a number of images to be labeled with bounding box annotation is based on a mean average precision of the prior iteration of training the machine learning model and an importance weight for the number of bounding boxes.

5. A computer-implemented method comprising:

under control of a computing system comprising one or more computer processors configured to execute specific instructions, processing a set of unlabeled training images using a machine learning model to generate a plurality of object detection outputs;

determining, based on the plurality of object detection outputs, a first portion of the set of unlabeled training images to be labeled with bounding boxes and a second portion of the set of unlabeled training images to be labeled with tags; and training the machine learning model using a set of labeled training images, wherein a first portion of the set of labeled training images corresponds to the first portion of the set of unlabeled training images, and wherein a second portion of the set of labeled training images corresponds to the second portion of the set of unlabeled training images.

6. The computer-implemented method of claim 5, further comprising:

removing the set of labeled training images from the set of unlabeled training images to create a second set of unlabeled training images;

verifying the second set of unlabeled training images comprises at least one or more images; and processing the second set of unlabeled training images using the machine learning model to generate a second plurality of object detection outputs.

7. The computer-implemented method of claim 5, wherein each image in the first portion of the set of labeled training images are labeled with bounding boxes and each image in the second portion of the set of labeled training images are labeled with tags.

8. The computer-implemented method of claim 5, wherein processing a set of unlabeled training images using a machine learning model to generate a plurality of object detection outputs comprises generating a plurality of object detection outputs comprising an entropy score indicating a level of uncertainty of object detection.

9. The computer-implemented method of claim 5, wherein the set of unlabeled training images is ranked based on the plurality of object detection outputs.

10. The computer-implemented method of claim 5, wherein processing the set of unlabeled training images using the machine learning model further comprises predicting one or more locations of objects in an image.

11. The computer-implemented method of claim 5, further comprising:

determining a percentage of training images to be labeled with bounding boxes and a percentage of training images to be labeled with tags based on an importance weight of bounding boxes, a current mean average precision of the machine learning model, and a target mean average precision of the machine learning model.

12. The computer-implemented method of claim 11, further comprising:

identifying a set of random unlabeled training images using a third portion of the set of unlabeled training images selected at random; and determining at random a first portion of the set of random unlabeled training images to be labeled with bounding boxes according to the percentage of training images to be labeled with bounding boxes and a second portion of the set of random unlabeled training images to be labeled with tags according to the percentage of training images to be labeled with tags.

13. The computer-implemented method of claim 11 wherein determining, based on the plurality of object detection outputs, the first portion of the set of unlabeled training images to be labeled with bounding boxes and the second portion of the set of unlabeled training images to be labeled with tags comprises determining the first portion of the set of unlabeled training images to be labeled with bounding boxes according to the percentage of training images to be labeled with bounding boxes and the second portion of the set of unlabeled training images to be labeled with tags according to the percentage of training images to be labeled with tags.

14. A system comprising:

computer-readable memory storing executable instructions; and one or more processors in communication with the computer-readable memory and programmed by the executable instructions to at least:

process a set of unlabeled training images using a machine learning model to generate a plurality of object detection outputs;

determine, based on the plurality of object detection outputs, a first portion of the set of unlabeled training images to be labeled with bounding boxes and a second portion of the set of unlabeled training images to be labeled with tags; and train the machine learning model using a set of labeled training images, wherein a first portion of the set of labeled training images corresponds to the first portion of the set of unlabeled training images, and wherein a second portion of the set of labeled training images corresponds to the second portion of the set of unlabeled training images.

15. The system of claim 14, further comprising:

remove the set of labeled training images from the set of unlabeled training images to create a second set of unlabeled training images;

verify the second set of unlabeled training images comprises at least one or more images; and process the second set of unlabeled training images using the machine learning model to generate a second plurality of object detection outputs.

16. The system of claim 14, wherein each image in the first portion of the set of labeled training images are labeled with bounding boxes and each image in the second portion of the set of labeled training images are labeled with tags.

17. The system of claim 14, wherein the plurality of object detection outputs comprises an entropy score indicating a level of uncertainty of object detection.

18. The system of claim 14, further comprising:

determine a percentage of training images to be labeled with bounding boxes and a percentage of training images to be labeled with tags based on an importance weight of bounding boxes, a current mean average precision of the machine learning model, and a target mean average precision of the machine learning model.

19. The system of claim 18, further comprising:

identify a set of random unlabeled training images using a third portion of the set of unlabeled training images selected at random; and determine at random a first portion of the set of random unlabeled training images to be labeled with bounding boxes according to the percentage of training images to be labeled with bounding boxes and a second portion of the set of random unlabeled training images to be labeled with tags according to the percentage of training images to be labeled with tags.

20. The system of claim 18, wherein the first portion of the set of unlabeled training images to be labeled with bounding boxes is determined according to the percentage of training images to be labeled with bounding boxes and the second portion of the set of unlabeled training images to be labeled with tags is determined according to the percentage of training images to be labeled with tags.

* * * * *